(12) United States Patent
Bialkowski et al.

(10) Patent No.: US 8,359,500 B2
(45) Date of Patent: Jan. 22, 2013

(54) METHOD AND SYSTEM FOR CONTROL OF COMMUNICATION EQUIPMENT BASED ON A BIT ERROR RATE DERIVED FROM A FRAME ALIGNMENT SIGNAL

(75) Inventors: Jan Bialkowski, San Jose, CA (US); Satish K. Sridharan, Chennai (IN); Ting-Kuang Chiang, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 847 days.

(21) Appl. No.: 12/496,038

(22) Filed: Jul. 1, 2009

(65) Prior Publication Data

US 2011/0004802 A1    Jan. 6, 2011

(51) Int. Cl.
*G66F 11/00* (2006.01)
(52) U.S. Cl. ......................................... 714/704
(58) Field of Classification Search .................. 714/704, 714/707; 398/129, 172
See application file for complete search history.

(56) References Cited

U.S. PATENT DOCUMENTS

| 6,295,614 B1* | 9/2001 | Peters et al. | 714/704 |
| 6,950,972 B2* | 9/2005 | Liu et al. | 714/714 |
| 7,200,344 B1* | 4/2007 | Hoshida | 398/202 |

OTHER PUBLICATIONS

Jai H. Eu, "An Evaluation of Error Performance Estimation Schemes for DS1 Transmission Systems Carrying Live Traffic," IEEE Transactions on Communications, vol. 38, No. 3, pp. 384-391, Mar. 1990.

* cited by examiner

*Primary Examiner* — Shelly A Chase
(74) *Attorney, Agent, or Firm* — David L. Soltz (57) ABSTRACT

Consistent with the present disclosure, circuitry may be provided in an optical receiver that can determine a bit error rate (BER) associated with an incoming signal by dividing the number of errored bits in a frame alignment signals (FAS) by the number of bits in the FAS. Accordingly, although an optical signal may be severely degraded and forward error correction (FEC) cannot be performed, a BER may be obtained if the FAS can be identified. The BER can then be used in a feedback loop to control various optical or electrical components in the receiver to improve or reduce the BER to a level, for example, at which FEC can be performed.

16 Claims, 4 Drawing Sheets

METHOD AND SYSTEM FOR CONTROL OF COMMUNICATION EQUIPMENT BASED ON A BIT ERROR RATE DERIVED FROM A FRAME ALIGNMENT SIGNAL

BACKGROUND

Optical communication systems are known in which multiple optical signals carrying data, for example, propagate along an optical fiber from a transmitter to a receiver. In such optical communication systems, often referred to as wavelength division multiplexed (WDM) optical communication systems, each optical signal has a corresponding one of a plurality of wavelengths. In the receiver, the optical signals are filtered or demultiplexed and converted into corresponding electrical signals which also carry the data. The data is typically in digital form and thus constitutes a series of binary bits. Errors often occur during transmission of the data, such as a "1" bit may be received as a "0" bit and visa versa. In order to correct for such errors, the data is coded in the transmitter in accordance with a so-called forward error correction (FEC) code, whereby additional bytes are added to the data and then manipulated by known algorithms. The encoded data is then transmitted to the receiver, where related algorithms may be used to decode the data and correct errored bits or bytes that may be present.

FEC, however, cannot correct for an unlimited number of errors present in the data. Rather, for a given FEC code to effectively eliminate errors, the number of errors present must be below a threshold amount. In particular, the bit error rate (BER) of the data, i.e., the ratio of errored bits to total number of transmitted bits, must be below a certain value. For example, typical FEC codes used in connection with communication systems that transmit a 10 giga-bit/second data streams, require that the BER must be below $10^{-3}$ to provide adequate error correction.

Under certain circumstances, however, the BER may exceed the error correcting capability of the FEC. For example, during start-up of the WDM optical communication systems noted above, various electrical or optical components in such systems may not be properly set to process the received optical signals, thereby resulting in excessively high bit error rates, e.g., greater than $10^{-3}$, which cannot be reduced by FEC. Such high bit error rates are typically unacceptable for many telecommunication applications.

Accordingly, there is a need for an optical communication system that can reduce bit error rates to facilitate adequate forward error correction decoding.

SUMMARY OF THE INVENTION

Consistent with an aspect of the present disclosure, a method is provided that comprises a step of receiving an optical signal from an optical component, which has a parameter associated therewith. The method also includes converting the optical signal to an electrical signal, which carries a series of bits. The series of bits includes a frame, and the frame includes a frame alignment signal (FAS). The method also includes the step of identifying the frame alignment signal in the series of bits and identifying errored bits in the frame alignment signal. In addition, the method includes the step of determining a bit error rate based on a number of the errored bits and a number of the series of bits included in the frame alignment signal. Further, the method includes adjusting the parameter based on the bit error rate.

Consistent with a further aspect of the present disclosure, a method is provided that comprises a step of converting an optical signal to an electrical signal, which carries a series of bits. The series of bits includes a frame that includes a frame alignment signal. The method also includes a step of supplying the electrical signal to a circuit, the circuit having a parameter associated therewith, and a step of identifying the frame alignment signal in the series of bits. In addition, the method includes steps of identifying errored bits in the frame alignment signal, and determining a bit error rate based on a number of the errored bits and a number of the series of bits in the frame alignment signal. Further, the method includes a step of adjusting the parameter based on the bit error rate.

Further, consistent with the present disclosure, an apparatus is provided that includes an optical component, which has a parameter associated therewith. A photodiode is also provided that is configured to convert an optical signal received from the optical component to an electrical signal, which carries a series of bits. The series of bits includes a frame, which has a frame alignment signal. The apparatus also includes a circuit coupled to the photodiode and configured to: identify the frame alignment signal, identify errored bits in the frame alignment signal, determine a bit error rate based on a number of errored bits and a number of the series of bits in the frame alignment signal, and generate a control signal based on the bit error rate, and adjust the parameter in response to the control signal.

In accordance with a further aspect of the present disclosure, an apparatus is provided that comprises a photodiode configured to convert an optical signal to an electrical signal. The electrical signal carries a series of bits, which includes a frame, and the frame includes a frame alignment signal. A first circuit is also provided that is configured to receive the electrical signal. The first circuit has a parameter associated therewith. A second circuit is also provided that is coupled to the first circuit and configured to: identify the frame alignment signal, identify errored bits in the frame alignment signal, determine a bit error rate based on the errored bits in the frame alignment signal and a predetermined number of the series of bits, and adjust the parameter based on the bit error rate.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure and together with the description, serve to explain the principles of the disclosure.

DESCRIPTION OF THE EMBODIMENTS

As generally understood, data is often transmitted to a receiver in frames that include header and payload portions. The payload typically carries the data itself and the header includes monitoring and network management information, for example. The header also includes a series of predetermined bits that indicates the start of a frame (often referred to as a frame alignment signal). Although the frame alignment signal may include errored bits, if the number of errored bits is below a predetermined amount, the frame alignment signal may still be recognized. Consistent with the present disclosure, circuitry may be provided in the receiver that can determine a bit error rate (BER) by dividing the number of errored bits by the number of bits in the frame alignment signal. Accordingly, although an optical signal may be severely degraded and forward error correction (FEC) cannot be performed, a BER may be obtained if the frame alignment signal can be identified. In addition, the bit length of the frame alignment signal is preferably sufficiently long to include a representative number of errored bits. The BER can then be used in a feedback loop to control various optical or electrical components in the receiver to improve or reduce the BER to a level, for example, at which FEC can be performed.

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
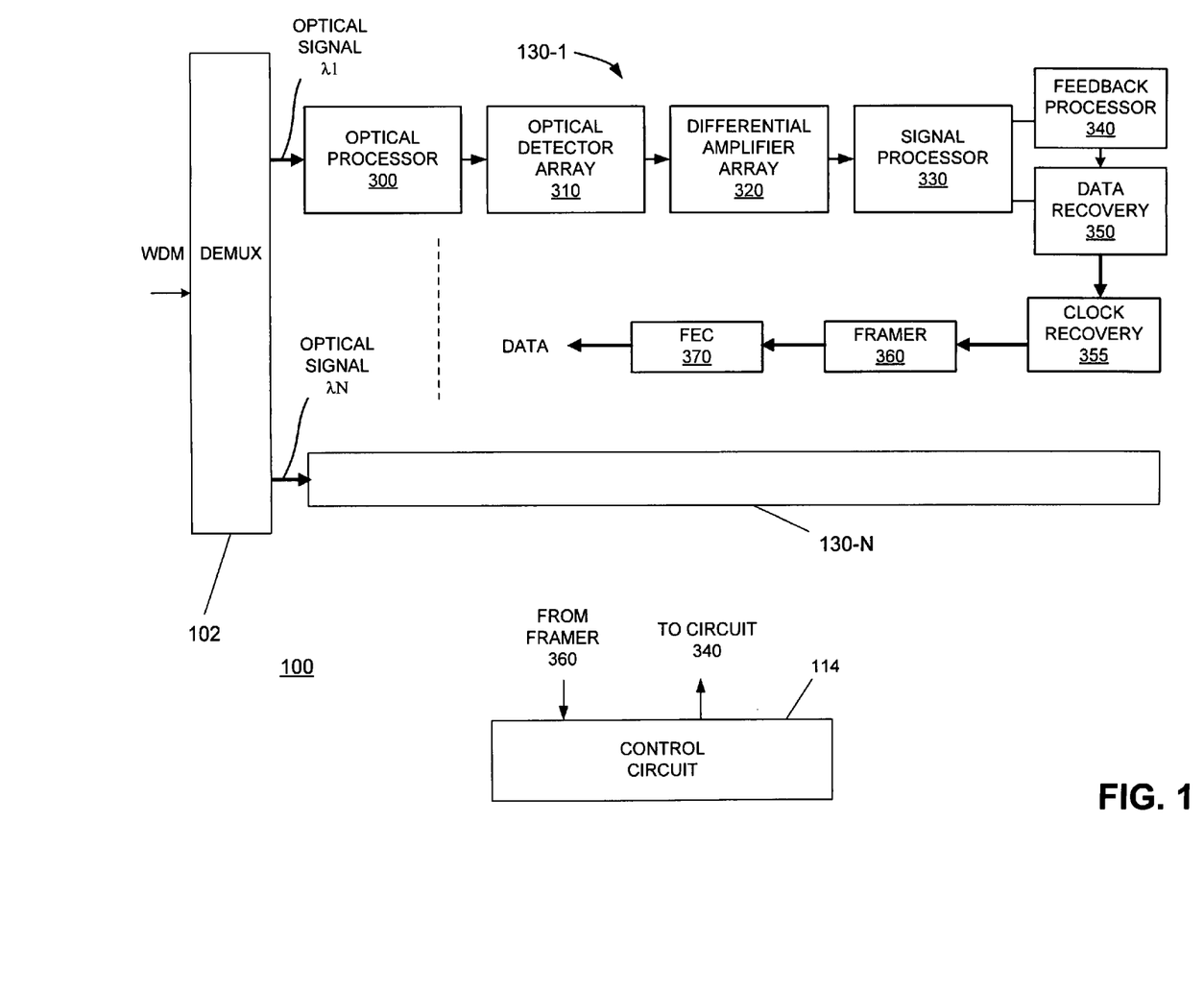
FIG. 1 is a block diagram of a receiver consistent with the present disclosure.

FIG. 1 illustrates a receiver 100 consistent with the present disclosure. Receiver 100 includes an optical component, such as an optical demultiplexer 102, that receives a wavelength division multiplexed (WDM) optical signal that includes a plurality of optical signals or channels. Demultiplexer 102 has a plurality of outputs, each of which supplying a corresponding one of the plurality of optical signals. Typically, each optical signal has a corresponding one of a plurality of wavelengths $\lambda 1$ to $\lambda N$. Other optical components, such as semiconductor optical amplifiers (SOAs) and or variable optical attenuators may be provided at the input or outputs of demultiplexer 102. Moreover, demultiplexer 102 may include an arrayed waveguide grating (AWG), de-interleaver, optical filter or another known demultiplexer. It is understood that such optical components are exemplary, and that the term "optical component," as used herein, refers to any optical device that modulates, attenuates, filters, demultiplexes, and/or amplifies an incoming optical signal.

Returning to FIG. 1, each optical channel output from demultiplexer 102 is supplied to a corresponding one of a plurality of receiver blocks 130-1 to 130-N, of which receiver block 130-1 is shown in greater detail. It is understood that remaining receiver blocks 130-2 to 130-N have the same or similar structure as receiver block 130-1.

Receiver block 130-1 may include an optical processor 300, an optical detector array 310, a differential transimpedance amplifier array 320, a signal processor 330, a feedback processor 340, data recovery circuit 350, clock recovery circuit 355, framer circuit 360, and forward error correction (FEC) decoder 370. Various components of receiver block 130-1 are also described in U.S. patent application Ser. No. 12/052,541, the entire contents of which are incorporated herein by reference.

Optical processor 300 may include a device or circuit that receives an optical signal having a wavelength $\lambda$ (e.g., $\lambda 1$), and splits the optical signal into a current bit optical signal and a previous bit optical signal. Optical processor 300 may polarize and split the current bit optical signal and the previous bit optical signal, and may combine the polarized and split current bit optical signal with the polarized and split previous bit optical signal to produce one or more mixed optical signals. Optical processor 300 may provide the one or more mixed optical signals to optical detector array 310. In one implementation, optical processor 300 may constitute an optical demultiplexer/demodulator for optical signals provided in a DQPSK modulation format.

Optical detector array 310 may include an array or circuit of one or more optical detectors. Each optical detector may receive a corresponding one of the one or more mixed optical signals, and may convert the mixed optical signal into a mixed electrical signal (e.g., by generating an electrical current proportional to an intensity of incident optical radiation). In one exemplary implementation, each optical detector may include a photodiode, such as a semiconductor positive-intrinsic-negative (PIN) photodiode, an avalanche photodiode (APD), etc. Optical detector array 310 may provide the one or more mixed electrical signals to differential transimpedance amplifier array 320.

Differential transimpedance amplifier array 320 may include an array or circuit of one or more differential amplifiers. Each differential amplifier may receive mixed electrical signals from a corresponding pair of optical detectors (e.g., provided by optical detector array 310), and may multiply a difference between the two inputs (e.g., mixed electrical signals) by a constant factor (e.g., a differential gain). Each differential amplifier may output a signal (e.g., an in-phase (I) signal or a quadrature-phase (Q) signal) based on the received mixed electrical signals.

Signal processor 330 may include a device or circuit that electronically reduces crosstalk between data signals (e.g., one or more mixed electrical signals). In one implementation, signal processor 330 may include a device capable of using multiple-input multiple-output (MIMO) signal processing (e.g., eight input, four output MIMO signal processing) to reduce crosstalk between data signals. For example, signal processor 330 may receive complex signals (e.g., from pairs of differential amplifiers within differential transimpedance amplifier array 320), and may reduce crosstalk between the complex signals using MIMO signal processing. Signal processor 330 may output multiple data streams to data recovery circuit 350.

Feedback processor circuit 340 may include a device or circuit that detects a correlation between received data streams (e.g., data streams provided by signal processor 330). In one implementation, feedback processor 340 may include a device capable of using a least-mean squares (LMS) algorithm to detect a correlation between received data streams. For example, feedback processor 340 may receive data streams from signal processor 330, and may use a LMS algorithm to detect a correlation between the data streams. Feedback processor 340 may receive one or more error signals based on a difference between the data streams received from signal processor 330 and recovered data streams. The LMS algorithm may determine filter coefficients that produce the least-mean squares of the error signals. Feedback processor 340 may provide feedback to signal processor 330 until the error signals are minimized (e.g., below a particular threshold) and/or eliminated.

Data recovery circuit 350 may include a device or circuit that generates error signals based on a difference between the data streams received from signal processor 330 and recovered data streams, and outputs recovered data streams if the error signals are minimized (e.g., below a particular threshold) and/or eliminated. In one implementation, data recovery circuit 350 may include one or more limiting amplifiers. Each limiting amplifier may receive data streams from signal processor 330, and may limit a voltage (e.g., an upper voltage limit and a lower voltage limit) of an output signal. Each limiting amplifier may generate data (e.g., a ten (10) G/s data stream) without crosstalk if the error signals are minimized (e.g., below a particular threshold) and/or eliminated. Further details of clock and data recovery circuit 350 are provided below in connection with FIG. 2. The output of data recovery circuit 350 may be provided to a known clock recovery circuit 355, which extracts timing or clock information from the output of data recovery circuit 350. Next, the output from clock recovery circuit 355 is supplied to framer circuit 360 and then to an FEC decoder circuit 370 for further error correction.

As further shown in FIG. 1, framer circuit 360 identifies frames within the data stream output from data recovery 350 and may also provide an output to control circuit 114. The output may include a frame alignment signal of each frame, and the frame alignment signal may contain errored bits. As discussed in greater detail below, control circuit 114 may supply an output to adjust parameters associated with feedback processor 340, and thus, improve the bit error associated with the data stream output from data recovery circuit 350. Framer circuit 360, in turn, forwards the data stream to forward error correction decoder 370.

Although FIG. 1 shows exemplary components of receiver block 130-1 in other implementations, optical receiver block 130-1 may contain fewer, different, or additional components than those depicted in FIG. 1. In still other implementations, one or more components of optical receiver block 130-1 may perform one or more other tasks described as being performed by one or more other components of optical receiver block 130-1.

Figure 2:
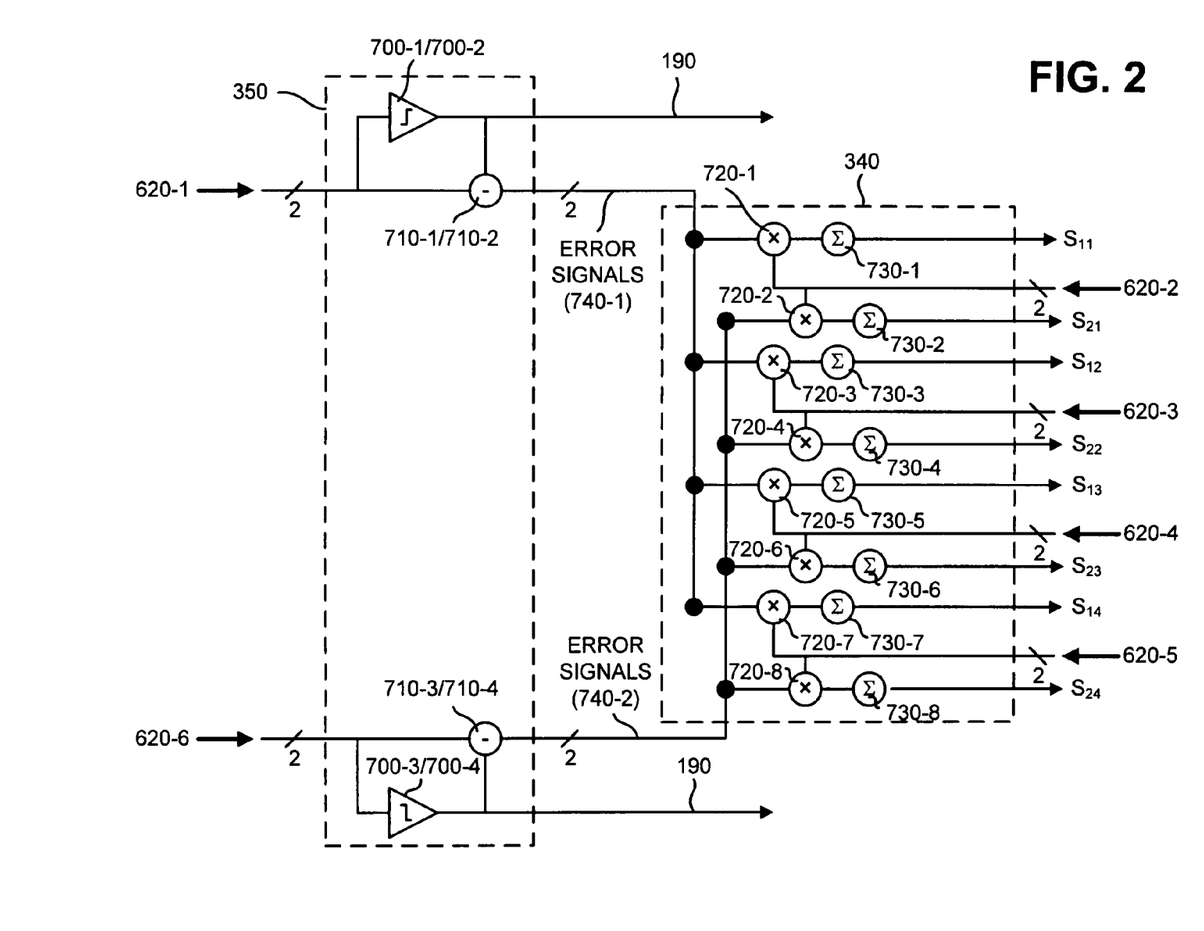
FIG. 2 illustrates the feedback processor and data recover circuits shown in FIG. 1 in greater detail.

FIG. 2 depicts a detailed diagram of exemplary components of feedback processor 340 and data recovery circuit 350, and interrelations among the exemplary components. While appropriate MIMO gain settings may be calculated and applied for any given Jones matrix associated with the optical communication path associated with the optical link that is coupled to the input of optical demultiplexer 102. Thus, in one implementation, signal processing may be performed on the received data streams to determine optimal MIMO gain settings.

As illustrated, data recovery 350 may include one or more limiting amplifiers 700-1, 700-2, 700-3, and 700-4 (collectively referred to as "limiting amplifiers 700" and singularly as "limiting amplifier 700"), and one or more linear subtraction elements 710-1, 710-2, 710-3, and 710-4 (collectively referred to as "linear subtraction elements 710" and singularly as "linear subtraction element 710"). Feedback processor 340 may include one or more gain elements 720-1, . . . , 720-8 (collectively referred to as "gain elements 720" and singularly as "gain element 720"), and one or more low pass filters 730-1, . . . , 730-8 (collectively referred to as "low pass filters 730" and singularly as "low pass filter 730"). In one implementation, the components of feedback processor 340 may perform a least-mean squares (LMS) algorithm. In other implementations, feedback processor 340 may utilize feedback mechanisms (e.g., a forward error correction (FEC) encoding, which approximates a bit-error ratio for a data stream) in addition to the LMS algorithm. In still other implementations, other means of encoding the individual data streams may be used to determine the residual crosstalk components in the outputs of the MIMO processor (e.g., signal processor 330), such as encoding each data stream with tones or unique digital bit streams within each data stream.

Limiting amplifier 700 may include a device that receives an input signal (e.g., an analog data signal), and outputs a particular output signal. For example, limiting amplifier 700 may receive an incoming analog data signal (e.g., that is either +1 volt or −1 volt), and may output a particular signal (e.g., that is either +1 volt or −1 volt). However, if a gain on limiting amplifier 700 is off by a small amount (e.g., "z"), limiting amplifier 700 may receive an incoming analog signal (e.g., that is either +1+z or −1+z), and may still output the particular signal (e.g., that is either +1 volt or −1 volt). The small amount (e.g., "z") may be considered an error signal. For example, as shown in FIG. 2, limiting amplifier 700-1 may receive one signal of mixed electrical signal pair 620-1, limiting amplifier 700-2 may receive another signal of mixed electrical signal pair 620-1, limiting amplifier 700-3 may receive one signal of mixed electrical signal pair 620-6, and limiting amplifier 700-4 may receive another signal of mixed electrical signal pair 620-6. Mixed electrical signal pairs 620-1 and 620-6 and limiting amplifiers 700 may be used to calculate error signals, as described below.

Linear subtraction element 710 may include a device that receives two signals (e.g., analog signals) and produces an output that is a linear difference of the two signals. As further shown in FIG. 2, linear subtraction element 710-1 may receive two signals (e.g., an input and an output signal of limiting amplifier 700-1), and may produce an output (e.g., one of error signals 740-1) that is a linear difference of the two signals. Linear subtraction element 710-2 may receive two signals (e.g., an input and an output signal of limiting amplifier 700-2), and may produce an output (e.g., another one of error signals 740-1) that is a linear difference of the two signals. Linear subtraction element 710-3 may receive two signals (e.g., an input and an output signal of limiting amplifier 700-3), and may produce an output (e.g., one of error signals 740-2) that is a linear difference of the two signals. Linear subtraction element 710-4 may receive two signals (e.g., an input and an output signal of limiting amplifier 700-4), and may produce an output (e.g., another one of error signals 740-2) that is a linear difference of the two signals.

Gain elements 720 has an associated parameter, such as gain or weight, and may include a device that receives four signals (e.g., analog signals) and produces an output that is a complex product of the four signals. A complex multiplier stage may be implemented as follows. The output in-phase (I) component may be a product of the first input's in-phase (I) and second input's in-phase (I) component, minus a product of the first input's quadrature-phase (Q) and second input's quadrature-phase (Q) component. The output quadrature-phase (Q) component may be a product of the first input's in-phase (I) and second input's quadrature-phase (Q) component, plus a product of the first input's quadrature-phase (Q) and second input's in-phase (I) component. In one implementation, gain element 720 may include an analog multiplier, a voltage-controlled amplifier, voltage-controlled attenuator, etc.

As further shown in FIG. 2, gain element 720-1 may receive four signals (e.g., the two error signals 740-1 and the mixed electrical signal pair 620-2), may multiply the four signals, and may output the complex product of the four signals (e.g., to low pass filter 730-1). Gain element 720-2 may receive four signals (e.g., the two error signals 740-2 and the mixed electrical signal pair 620-2), may multiply the four signals, and may output the complex product of the four signals (e.g., to low pass filter 730-2). Gain element 720-3 may receive four signals (e.g., the two error signals 740-1 and the mixed electrical signal pair 620-3), may multiply the four signals, and may output the complex product of the four signals (e.g., to low pass filter 730-3). Gain element 720-4 may receive four signals (e.g., the two error signals 740-2 and the mixed electrical signal pair 620-3), may multiply the four signals, and may output the complex product of the four signals (e.g., to low pass filter 730-4). Gain element 720-5 may receive four signals (e.g., the two error signals 740-1 and the mixed electrical signal pair 620-4), may multiply the four signals, and may output the complex product of the four signals (e.g., to low pass filter 730-5). Gain element 720-6 may receive four signals (e.g., the two error signals 740-2 and the mixed electrical signal pair 620-4), may multiply the four signals, and may output the complex product of the four signals (e.g., to low pass filter 730-6). Gain element 720-7 may receive four signals (e.g., the two error signals 740-1 and the mixed electrical signal pair 620-5), may multiply the four signals, and may output the complex product of the four signals (e.g., to low pass filter 730-7). Gain element 720-8 may receive four signals (e.g., the two error signals 740-2 and the mixed electrical signal pair 620-5), may multiply the four signals, and may output the complex product of the four signals (e.g., to low pass filter 730-8). Each gain element 720 may further multiply the received inputs by a weight or gain value.

Low pass filter 730 may include a device (e.g., a filter) that passes low-frequency signals but attenuates (i.e., reduces amplitudes of) signals with frequencies higher than a cutoff frequency. A low-pass filter operating on a signal with both in-phase (I) and quadrature-phase (Q) components may be implemented as separate low pass filters on each of these components. In one implementation, the low-pass filter may be an integrator. In another implementation, the low-pass filter may be a digital accumulator. For example, as shown in FIG. 2, low pass filter 730-1 may receive a signal from gain element 720-1, may attenuate the signal (if necessary), and may output the signal (e.g., as signal $S_{11}$). Low pass filter 730-2 may receive a signal from gain element 720-2, may attenuate the signal (if necessary), and may output the signal (e.g., as signal $S_{21}$). Low pass filter 730-3 may receive a signal from gain element 720-3, may attenuate the signal (if necessary), and may output the signal (e.g., as signal $S_{12}$). Low pass filter 730-4 may receive a signal from gain element 720-4, may attenuate the signal (if necessary), and may output the signal (e.g., as signal $S_{22}$). Low pass filter 730-5 may receive a signal from gain element 720-5, may attenuate the signal (if necessary), and may output the signal (e.g., as signal $S_{13}$). Low pass filter 730-6 may receive a signal from gain element 720-6, may attenuate the signal (if necessary), and may output the signal (e.g., as signal $S_{23}$). Low pass filter 730-7 may receive a signal from gain element 720-7, may attenuate the signal (if necessary), and may output the signal (e.g., as signal $S_{14}$). Low pass filter 730-8 may receive a signal from gain element 720-8, may attenuate the signal (if necessary), and may output the signal (e.g., as signal $S_{24}$). Signals $S_{11}$, $S_{21}$, $S_{12}$, $S_{22}$, $S_{13}$, $S_{23}$, $S_{14}$, and $S_{24}$ may be provided by feedback processor 340 to signal processor 330.

In operation, linear subtraction elements 710-1 and/or 710-2 may generate error signals (e.g., error signals 740-1) if a difference is calculated for the input and output signals of limiting amplifiers 700-1 and/or 700-2. Linear subtraction elements 710-3 and/or 710-4 may generate error signals (e.g., error signals 740-2) if a difference is calculated for the input and output signals of limiting amplifiers 700-3 and/or 700-4. Error signals 740-1 and/or 740-2 may be provided to feedback processor 340, and feedback processor 340 may adjust one or more gain elements 720 (which may adjust one or more signals $S_{11}$, $S_{21}$, $S_{12}$, $S_{22}$, $S_{13}$, $S_{23}$, $S_{14}$, and $S_{24}$ provided to signal processor 330) until error signals 740-1/740-2 are minimized (e.g., below a particular threshold) and/or eliminated. If error signals 740-1/740-2 are minimized and/or eliminated, one or more limiting amplifiers 700 may output data signals, which may be independent of a polarization and/or carrier frequency of an optical signal received by receiver block 130-a. Minimization and/or elimination of error signals 740-1/740-2 may also open an "eye" of optical receiver 130-a in a least-mean squares sense.

The LMS algorithm provided by feedback control 340 may provide a relatively fast signal recovery that may be sufficient for tracking either polarization effects or transients introduced by single channel failures in a transit optical fiber (e.g., optical fiber 140). The LMS algorithm may reject crosstalk, and coupling coefficients utilized by the LMS algorithm may be analyzed and used as inputs to a filter alignment algorithm (e.g., provided by one or more components of optical receiver 130-a).

The arrangement of optical receiver 130-1 described herein may enable determination of a direction and a magnitude of a DQPSK demodulation filter offset (e.g., via tap coefficients), which may eliminate a need for a dither (e.g., an optical power limit can be increased by dithering a transmit optical center frequency) to be applied to the DQPSK demodulation filter. The arrangement of optical receiver 130-1 may improve tolerance to filter alignment, which may be utilized in multichannel optical receivers. In one implementation, choices of update algorithms, data sampling, precision for error or correlation feedback paths, use of tones or training sequences for setting tap coefficients, etc. may be optimized depending on a particular implementation.

In many cases, the MIMO signal processing discussed above may eliminate the need for the phase of a single bit delay to be aligned to the phase of the carrier signal. In this case, optical receiver 130-1 may be configured without phase controls. For example, optical signal processing may be done with a Planar Lightwave Circuit (PLC) without requiring fine tuning of optical phases within the PLC. Compared to coherent optical receivers, optical receiver 130-a may be less sensitive to phase noise of optical transmitter 110 and a local oscillator receiver. Furthermore, transient changes in a frequency of optical transmitter 110 may be tracked using the LMS algorithm rather than other optical approaches.

Although FIG. 2 shows exemplary components of feedback processor 340 and data recovery circuit 350, in other implementations, feedback processor 340 and/or data recovery 350 may contain fewer, different, or additional components than depicted in FIG. 2. In still other implementations, one or more components of feedback processor 340 and/or data recovery 350 may perform one or more other tasks described as being performed by one or more other components of feedback processor 340 and/or data recovery 350.

Thus, MIMO processing may be beneficial in outputting data carried by polarization multiplexed optical signals. The output data may have a relatively low bit error rate, such that FEC circuit 370 may correct remaining errors in the data stream. At system start-up, however, the gain or weight values associated with gain elements 720 may differ substantially from the gain values required for feedback processor 340 to supply signals that facilitate the MIMO processing discussed above. As such, signal processor 330 may not generate a data stream with a bit error rate that is low enough for FEC circuit 370 to perform error correction.

Consistent with an aspect of the present disclosure, the gains or weight values ("parameters") of gain elements 720 may be further adjusted or tuned based on a bit error rate. Namely, as discussed in greater detail below control circuit 114 may be configured to determine the bit error rate based on a number of errored bits in a frame alignment signal in each frame (see FIG. 3). Control circuit 114 may then determine appropriate gain or weight values for one or more of the gain elements 720 in accordance with the bit error rate to provide improved performance of feedback processor 340 to thereby output data with a reduced BER. As a result, the BER may be lowered to a level such that forward error correction can be performed FEC circuit 112, for example.

Figure 3:
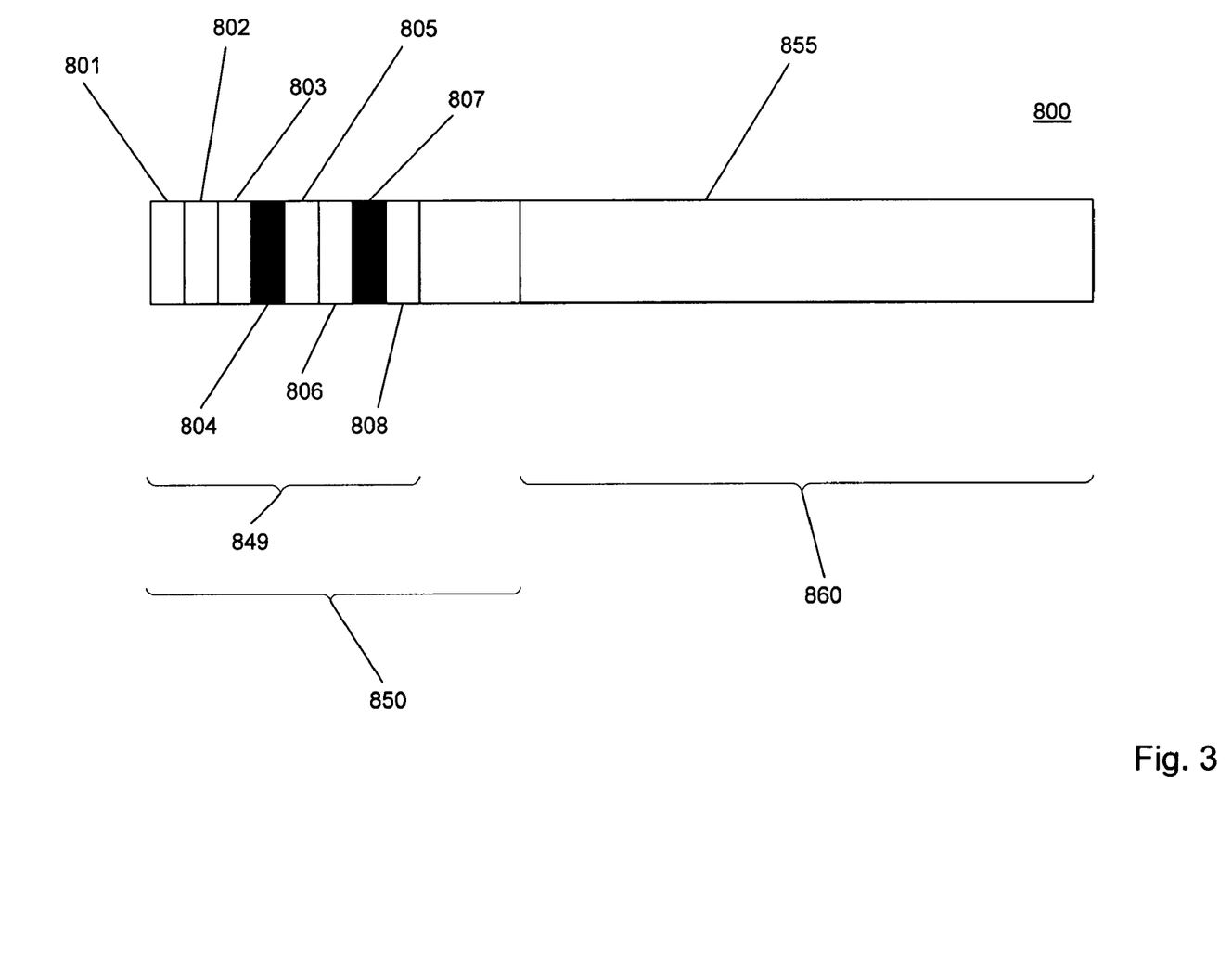
FIG. 3 is a diagram of a frame consistent with a further aspect of the present disclosure.

FIG. 3 illustrates an exemplary series of bits (or bit series) 800 that may be output from data recovery circuit 350. Bit series 800 may include a frame 855, which has a payload portion 860 that carries customer or client information, and a header 850, which, as noted above, carries monitoring and network management information, for example. Header 850 also includes the frame alignment signal 849, which may include bits 801 to 808, for example, some of which may be errored (e.g., bits 804 and 807). Although one frame is shown in FIG. 3, it is understood that the bit series 800 includes a plurality of frames that are successively output from data recovery circuit 350.

Figure 4:
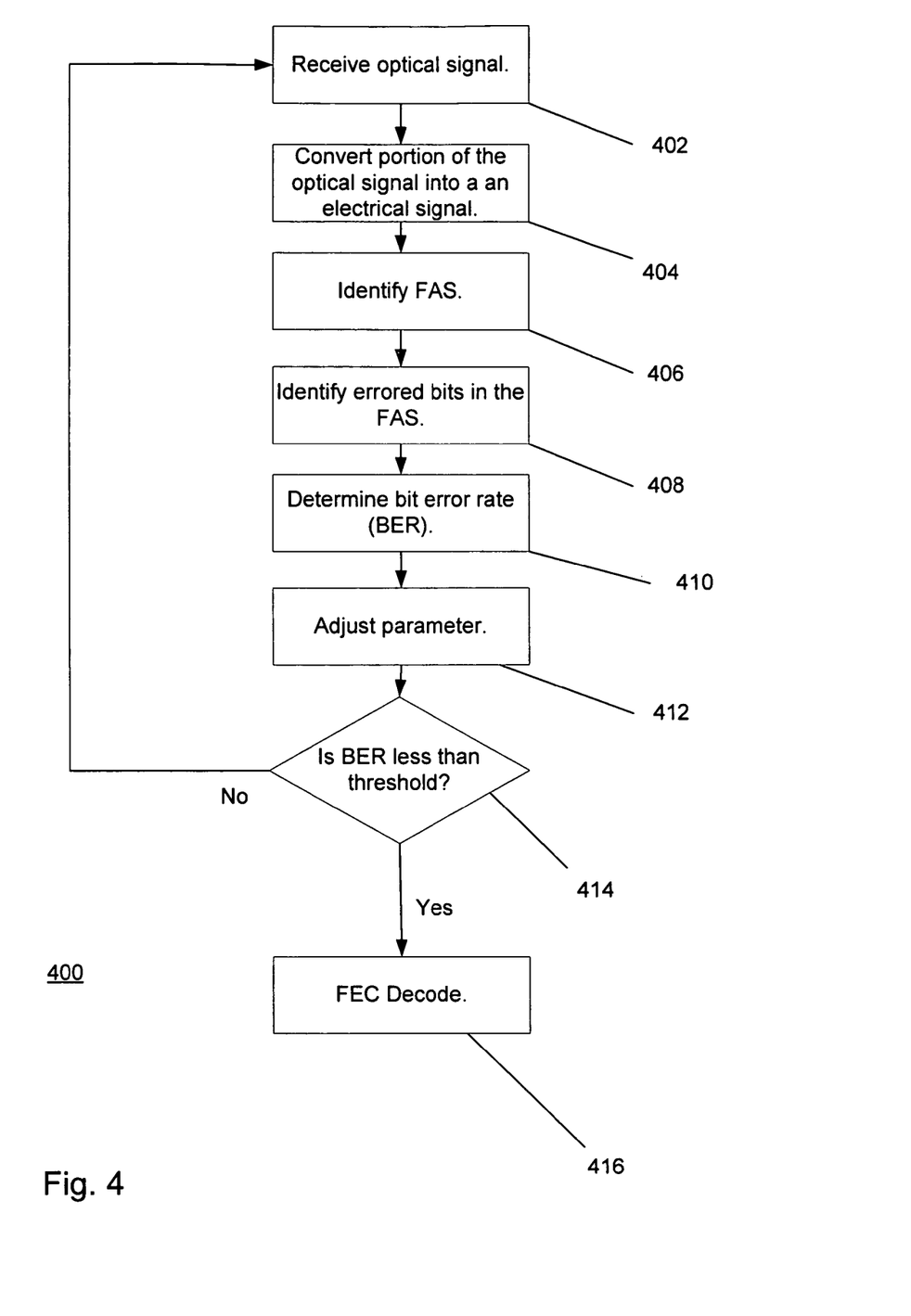
FIG. 4 is a diagram of a flowchart of a method consistent with an additional aspect of the present disclosure.

Operation of control circuit 114 will next be described with reference to flowchart 400 shown in FIG. 4. In step 402, an optical signal, such as a WDM signal including optical channels $\lambda 1$ to $\lambda n$ is received by an optical component, such as demultiplexer 102. As noted above, a portion of the optical signal, e.g., optical channel having wavelength $\lambda 1$, is output from demultiplexer 102 to optical detector array 310, which converts the optical channel into an electrical signal (step 404). The electrical signal is subject to processing by, for example, differential amplifier array 320, signal processor 330, feedback processor 340, data recovery circuit 350, clock recovery circuit 355, and framer circuit 360 to obtain a data stream (e.g., the series of bits 800) including a series of frames (e.g., frame 855). Using a maximum likelihood estimator (MLE) algorithm or other known algorithm, framer circuit 360 may identify a frame alignment signal in a header, for example, of each frame (step 406). By comparing the received frame alignment signal with an "ideal" frame alignment signal that does not contain any errors, errored bits can be identified in the frame alignment signal (step 408) and the number of such bits can be determined. A bit error rate for each frame can then be calculated (step 410) by dividing the number of errored bits by the number bits (i.e., a number of the series of bits) in the frame alignment signal. Optionally, the BER of each frame can be summed over a specific number of frames, and this sum can then be divided by the number of frames to yield an average bit error rate.

Based on either the average or frame specific BER of initially transmitted frames, control circuit 114 may generate a control signal which may include weight or gain values that is supplied to the feedback processor circuit 340 to adjust the gains or weights ("parameters") associated with gain elements 720 (step 412). Accordingly, signal quality for subsequently transmitted series of bits (which also include frames, as noted above) can be improved to thereby achieve a lower the bit error rate. If control circuit 114 determines that the bit error rate associated with the subsequently transmitted series of bits (a second series of bits or second plurality of series of bits) is below a predetermined threshold (step 414), such as $10^{-3}$, such bits are subject to forward error correction decoding by FEC decoder circuit 112 (step 416). Otherwise, steps 402, 404, 406, 408, 410, and 412 are repeated to reduce the bit error rate below the threshold whereby FEC decoding may be performed effectively.

In the above example, control circuit 114 may, in addition to, or instead of, supplying an output to feedback processor 340, also supply control signals or outputs to other electrical circuits or optical components in receiver 100 to adjust the parameters associated therewith in order to, for example, achieve a lower bit error rate. For example, control signals may be supplied, in response to the BER determined based on the errors present in the frame alignment signal, to circuitry, such as a heater, that adjusts the transmission characteristic of demultiplexer 102.

It is understood that receiver blocks 130-2 to 130-N contain the same or similar components and operate in the same or similar fashion as those components included in receiver block 130-1 to process each of a corresponding one of a plurality of optical signals having wavelengths $\lambda 2$ to $\lambda N$. Accordingly, as noted above, the steps discussed above in connection with FIG. 4 for controlling BER associated with the data stream or series of bits transmitted in receiver block 130-1 are also applicable to remaining receiver blocks 130-2 to 130-N.

Other embodiments of the disclosure will be apparent to those skilled in the art from consideration of the specification and practice of the invention disclosed herein. For example, although individual circuits are described above, it is understood that such circuits may themselves include multiple circuits, chips, and/or printed circuit boards having such circuits provided thereon. In addition, data recovery circuit 350 and clock recovery circuit 355 may be combined into one circuit. It is intended that the specification and examples be considered as exemplary only, with a true scope and spirit of the invention being indicated by the following claims.

What is claimed is:

1. A method, comprising:
   receiving an optical signal from an optical component, the optical component having a parameter associated therewith;
   converting the optical signal to an electrical signal, the electrical signal carrying a series of bits, the series of bits including a frame, the frame including a frame alignment signal;
   identifying the frame alignment signal in the series of bits;
   identifying errored bits in the frame alignment signal;
   determining a bit error rate based on a number of the errored bits and a number of the series of bits included in the frame alignment signal; and
   adjusting the parameter based on the bit error rate.

2. A method in accordance with claim 1, wherein the series of bits is a first series of bits, and the bit error rate is a first bit error rate, the method further including:
   after the parameter has been adjusted, supplying a second series of bits having a second bit error rate, which is less than the first bit error rate; and
   decoding the second series of bits in accordance with a forward error correction code.

3. A method in accordance with claim 1, wherein the optical component is an optical demultiplexer.

4. A method in accordance with claim 1, further comprising:
   identifying each of a plurality of additional frame alignment signals in the series of bits;
   identifying additional errored bits in said each of the plurality of additional frame alignment signals;
   determining an average bit error rate based on a number of the additional errored bits and a number of a series of bits in each of the plurality of frame alignment signals.

5. A method, comprising:
   converting an optical signal to an electrical signal, the electrical signal carrying a series of bits, the series of bits including a frame, the frame including a frame alignment signal;
   supplying the electrical signal to a circuit, the circuit having a parameter associated therewith;
   identifying the frame alignment signal in the series of bits;
   identifying errored bits in the frame alignment signal;
   determining a bit error rate based on a number of the errored bits and a number of the series of bits in the frame alignment signal; and
   adjusting the parameter based on the bit error rate.

6. A method in accordance with claim 5, wherein the series of bits is a first series of bits, and the bit error rate is a first bit error rate, the method further including:
   after the parameter has been adjusted, supplying a second series of bits having a second bit error rate, which is less than the first bit error rate; and decoding the second series of bits in accordance with a forward error correction code.

7. A method in accordance with claim 5, further comprising:
identifying each of a plurality of additional frame alignment signals in the series of bits;
identifying additional errored bits in said each of the plurality of additional frame alignment signals;
determining an average bit error rate based on a number of the additional errored bits and a number of a series of bits in each of the plurality of frame alignment signals.

8. An apparatus, comprising:
an optical component, the optical component having a parameter associated therewith;
a photodiode configured to convert an optical signal received from the optical component to an electrical signal, the electrical signal carrying a series of bits, the series of bits including a frame, the frame including a frame alignment signal;
a circuit coupled to the photodiode and configured to identify the frame alignment signal, identify errored bits in the frame alignment signal, determine a bit error rate based on a number of errored bits and a number of the series of bits in the frame alignment signal, and generate a control signal based on the bit error rate, the parameter being adjusted in response to the control signal.

9. An apparatus in accordance with claim 8, wherein the series of bits is a first series of bits and the bit error rate is a first bit error rate, the apparatus further including:
a forward error correction (FEC) decoder circuit,
wherein after the parameter has been adjusted, the FEC decoder circuit decodes a second series of bits in accordance with a forward error correction code, the second series of bits having a bit error rate less than the first series of bits.

10. An apparatus in accordance with claim 8, wherein the optical component includes an optical demultiplexer.

11. An apparatus, comprising:
a photodiode configured to convert an optical signal to an electrical signal, the electrical signal carrying a series of bits, the series of bits including a frame, the frame including a frame alignment signal;
a first circuit configured to receive the electrical signal, the first circuit having a parameter associated therewith;
a second circuit coupled to the first circuit and configured to identify the frame alignment signal, identify errored bits in the frame alignment signal, determine a bit error rate based on the errored bits in the frame alignment signal and a predetermined number of the series of bits, and adjust the parameter based on the bit error rate.

12. An apparatus in accordance with claim 11, wherein the series of bits is a first series of bits, and the bit error rate is a first bit error rate, the apparatus further including:
a third circuit including a forward error correction decoder circuit, the third circuit being coupled to the second circuit,
wherein after the parameter has been adjusted, the third circuit decodes a second series of bits in accordance with a forward error correction code.

13. An apparatus, comprising:
a photodiode configured to convert the optical signal into an electrical signal, each of a plurality of portions of the electrical signal including a corresponding one of a plurality of series of bits, each of the plurality of the series of bits including a corresponding one of a plurality of frames, each of the plurality of frames including a corresponding one of a plurality of frame alignment signals;
a first circuit that receives each of the plurality of portions of the electrical signal, the circuit having a parameter associated therewith;
a second circuit that identifies each of the frame alignment signals in each of the plurality of series of bits, identifies errored bits in each of the plurality of frame alignment signals, determines a bit error rate based on a number of the errored bits in each of the plurality of frame alignment signals and a number of the series of bits in each of the plurality of frame alignment signals, and supplies a control signal in response to the bit error rate, the parameter being adjusted in response to control signal.

14. An apparatus in accordance with claim 13, wherein the plurality of series of bits is a first plurality of series of bits and the bit error rate is a first bit error rate, the apparatus further including:
a third circuit including a forward error correction (FEC) circuit,
wherein, after the parameter has been adjusted, the third circuit decodes the second plurality of series of bits in accordance with a forward error correction code.

15. An apparatus in accordance with claim 11, wherein the first circuit is configured to perform MIMO processing of the electrical signal, the first circuit including a plurality of gain elements, the parameter being a gain associated with at least one of the plurality of gain elements.

16. An apparatus in accordance with claim 13, wherein the first circuit is configured to perform MIMO processing of the electrical signal, the first circuit including a plurality of gain elements, the parameter being a gain associated with at least one of the plurality of gain elements.

* * * * *